United States Patent Office 2,923,618
Patented Feb. 2, 1960

2,923,618

TREATMENT OF COPPER LEACH SOLUTIONS

C Ernst Redemann, Monterey Park, Calif., and Henry J. Tschirner, Kansas City North, Mo., assignors to The Fluor Corporation, Ltd., Los Angeles, Calif., a corporation of California No Drawing. Application September 8, 1958
Serial No. 759,405

12 Claims. (Cl. 75—108)

This invention relates generally to the production of copper powder having a low lead and tin content from copper-ammonia-carbon dioxide leach solutions by reducing the copper with a reducing gas such as hydrogen, and is particularly directed to an improved method for the removal of lead and tin from the alkaline copper-containing solution prior to reduction. Illustrative composition ranges for such solutions are as follows (zinc may or may not be present, and the pH of the solutions typically range between about 10 to 12):

| | grams/liter |
|---|---|
| Copper | 90 to 170 |
| Ammonia | 140 to 180 |
| Carbon dioxide | 90 to 130 |
| Zinc | 0 to 60 |
| Lead | 0.2 to 4.0 |
| Tin | 0.2 to 2.0 |

The process most commonly employed for producing a copper powder of low lead content is to reduce the copper-containing solution, along with its content of soluble lead and tin compounds, without purification prior to reduction. Subsequent to reduction the lead impurity, but not the tin impurity coproduced in the reduction stage, is removed from the copper powder by washing the powder with an aqueous acetic acid solution containing 5 percent to 20 percent acetic acid. Using this process a copper powder customarily containing about 0.05 percent lead and variable amounts of tin is obtained, although lead contents both larger and smaller may be obtained depending upon such factors as acetic acid concentration, time and temperature of the acid washing, amount of lead initially present in the solution, etc. While this process gives moderately satisfactory results, it is necessary to either recover or purify the acetic acid if the process is to be economically sound.

Another type of process in which the lead may be removed prior to reduction of the copper-bearing solution, consists of heating the liquor to an elevated temperature at autogeneous pressure (the pressure is quite large because of the decomposition of the ammonium carbonate at this temperature) and holding the solution at this tempertaure under pressure for a suitable time. This solution is then filtered through a micro-porous stainless steel filter to remove the precipitated lead oxide or other lead compound. While this process can be made to operate on a small scale in batch operation, it is frought with mechanical difficulties when an attempt is made to apply it on a large scale to a continuous operation. The micro-porous stainless steel filter soon becomes blocked by the slimy precipitate, and because of the large pressure drop which then develops across the filter surface the slime is driven into the pores of the filter so firmly that it cannot be removed in any convenient manner.

While lead carbonate and lead sulfate are both very sparingly soluble compounds it is not possible to remove lead from these copper-ammonia-carbon dioxide solutions merely by adding a soluble sulfate to the solution. This phenomenon is attributed to several causes all acting together; the lead and tin combine to form some soluble unionized substance, possibly in the nature of stannous or stannic plumbite; very little free carbonate ion exists in this solution as the ammonia and carbon dioxide combine largely to give ammonium carbamate, the ammonium salt of carbamic acid; in alkaline solution (pH about 11) the simple lead ion is extensively converted into the plumbite ion. This combination of circumstances leads to a lead and tin content both many times as large as would be predicted on the basis of their solubility in water.

The present invention has for its general object to accomplish the simultaneous removal of both lead and tin from copper-ammonia-carbon dioxide leach liquors, prior to their reduction by hydrogen or other reducing gas. This process has advantages not apparent solely in the purity of the product. For example, the removal of these impurities at an early stage in the process considerably diminishes the fouling of surfaces in the heat exchangers. Since there is no longer need for the acetic acid wash, certain items of equipment may be eliminated or replaced by less expensive equipment at a different point in the process.

The invention contemplates adding a soluble sulfate to the leach liquor in quantity several times as large as the lead content of the solution followed by the addition of a solution of a water soluble salt or hydroxide of strontium, barium or calcium, of which strontium salts, such as strontium nitrate, strontium acetate or strontium hydroxide are preferred. The strontium sulfate which forms under these conditions slowly equilibrates with the lead content of the solution thus removing it from solution. As the lead is removed from solution the lead-tin complex is decomposed permitting the tin to precipitate, probably as metastannic acid. Thus both the tin and lead are removed by the same procedure. Since the solubilities of neither strontium sulfate or lead sulfate change very rapidly with the temperature, it is possible to employ this process over a wide temperature range of 10–100° C., but for practical considerations we prefer to operate at nea ror slightly above ambient temperatures.

Various soluble sulfates which give appreciable quantities of the sulfate ion in solution may be employed. These include sulfuric acid, ammonium sulfate, copper sulfate, zinc sulfate, sodium, potassium and lithium sulfates, and those organic sulfates which are salts of substituted ammonias, such as methylammonium or isopropylammonium sulfates. However, from the standpoint of cost and convenience, sulfuric acid or ammonium sulfate are to be preferred. The quantity of sulfate added may be varied over a considerable range, but preferred operation is over the range one to ten times as many moles of soluble sulfate as moles of e.g. soluble strontium salt used. Increasing the quantity of strontium favors the lead and tin removal, but economic factors cause one to seek a balance between operating cost and complete lead removal. A sulfate ion concentration of 5–20 grams per liter is frequently satisfactory. The soluble sulfate should be added before the strontium or other precipitating salt is added.

Only strontium, barium and calcium appear to give insoluble salts which are capable of co-precipitating lead from solution. Several conditions must be met here. First, the sulfates must be insoluble; second, the ionic radius of the lead ion and the co-precipitating ion should be of similar size and charge; third, the crystal system should be the same or very similar for the lead sulfate and the co-precipitating sulfate. Any readily soluble salts of strontium, barium or calcium can be used; for example, nitrate, acetate, formate, chloride, bromide, etc. Likewise, the hydroxides can be used when sufficiently soluble. The chloride and bromide are less desirable because of the serious corrosion problems they would introduce and their tendency to form slightly ionized lead salts.

The quantity of the soluble precipitating compound to be added is largely determined by two factors: How low lead content is desired in the purified leach liquor, and the quantity of lead initially present. A practical level of precipitating compound (typically strontium) addition was found to be 2.25 grams of strontium per gram of lead initially present. However, both larger and smaller amounts may be employed within the scope of this invention. The addition of lesser amounts of strontium serves to remove a smaller portion of the contained lead, while the addition of a larger ratio of strontium to lead will more completely remove the lead. The tin concentration follows the lead somewhat, although it appears to drop somewhat more rapidly. Practical limits may be defined as 1.0 to 8.0 grams of strontium, barium or calcium (in the form of a soluble salt or hydroxide) per gram of lead in the leach liquor.

It has been discovered that the soluble sulfate must be added prior to the addition of the soluble precipitating compound. Reversing the order of addition greatly impairs the efficiency of lead and tin removal. Further, it has been found that the soluble precipitating salt may be added as a single portion, in divided portions or continuously, the preferred method depending upon other features of the process design. Since this is a co-precipitation process in which the strontium, barium or calcium always predominate, it is necessary to employ the precipitating compound in appreciable excess.

The following examples illustrate the application of the process to a rich copper leach liquor:

Example I

One liter of rich leach liquor having the composition:

| | Grams/liter |
|---|---|
| Copper | 150 |
| Zinc | 16.5 |
| Ammonia | 147 |
| Carbon dioxide | 108 |
| Lead | 1.21 |
| Tin | .084 | was treated with 10 grams/liter of ammonium sulfate and the mixture was stirred until a homogeneous solution resulted. This solution was then treated with a 16 percent solution of strontium nitrate in the following manner; a portion of the 16 percent solution containing 1.6 g. of strontium nitrate was added, the solution was again stirred for 2 hours and then filtered. This sequence was repeated as shown in the following table.

| Total Strontium Nitrate Added, grams/liter | Pb Content of Filtrate, grams/liter | Tin Content of Filtrate, grams/liter |
|---|---|---|
| 0 | 0.90 | 0.08 |
| 1.6 | 0.43 | |
| 3.2 | 0.17 | |
| 4.8 | 0.05 | 0.00 |

Example II

The leach liquor used in this example had the same composition as that employed in example one above. The ammonium sulfate added was 20 grams/liter and the strontium nitrate solution was again a 16 percent solution, but smaller increments were used. Other conditions were the same as in Example I.

| Total Strontium Nitrate Added, grams/liter | Pb Content of Filtrate, grams/liter | Tin Content of Filtrate, grams/liter |
|---|---|---|
| 0 | 0.90 | 0.08 |
| 0.96 | 0.72 | |
| 1.92 | 0.31 | |
| 2.88 | 0.07 | 0.00 |

Example III

One liter of rich leach liquor was treated with 5 grams of ammonium sulfate after which 5.6 grams of strontium nitrate were added in the form of a 16 percent aqueous solution. The mixture was stirred for 2 hours at 25° C. and was then filtered through a fine grained filter paper. The initial lead content of the rich liquor was 0.91 g./l. and the tin was 0.08 g./l. Following the above strontium treatment the lead concentration was reduced to 0.095 g./l. and the tin concentration to 0.00 g./l. This treated solution was then reduced in a hydrogen atmosphere at elevated temperature and pressure. The copper powder obtained from this solution had a lead content of 0.0045 percent and a tin content of 0.000 percent. (On the basis of the lead content of the untreated leach liquor, a lead content of about 0.4 percent would have been expected if no treatment had been used.)

Example IV

Samples of a rich leach liquor having the composition:

| | Grams/liter |
|---|---|
| Copper | 140 |
| Ammonia | 154 |
| Carbon dioxide | 110 |
| Zinc | 15.6 |
| Lead | 1.16 |
| Tin | 0.20 | were treated with ammonium sulfate to give a solution containing 20 grams of ammonium sulfate per liter. Three separate samples of this solution were treated with 10 percent solutions of (a) strontium nitrate (b) strontium acetate, and (c) strontium chloride to give solutions having 2 grams/liter of strontium added. These solutions were stirred for the indicated time and samples were removed for analysis. The percentage lead removal is indicated in the following table (all the tin being precipitated with the lead):

| Time of Stirring, hrs. | Percentage Lead Removal | | |
|---|---|---|---|
| | Nitrate | Acetate | Chloride |
| 2 | 77 | 70 | 67 |
| 4 | 79 | 70 | 72 |
| 6 | 85 | 79 | 78 |

Example V

A rich liquor having the composition:

| | Grams/liter |
|---|---|
| Copper | 143 |
| Ammonia | 153 |
| Carbon dioxide | 115 |
| Zinc | 17.2 |
| Lead | 1.165 |
| Tin | 0.15 | was treated with ammonium sulfate to give a solution containing 10 grams/liter of sulfate ion. Three portions of this solution were treated with 10 percent solutions of (a) barium chloride, (b) calcium chloride, and (c) strontium chloride until one gram per liter of each of these salts had been added. The table below compares the results after stirring for two hours, filtering, and analyzing the filtrate. The tin precipitated out of solution with the lead.

| Salt Added | Percentage Lead Removal |
|---|---|
| Barium chloride | 50 |
| Calcium chloride | 29 |
| Strontium chloride | 73 |

The invention is believed to mark the first instance in which it has been recognized that the sequential sulfation and addition of the soluble alkaline earth compound to a carbonate solution which initially had, and thereafter retained through the precipitation, a pH within about the 10–12 range, could accomplish removal of both lead and tin from the solution. The results are surprising since calcium and strontium carbonates are less soluble than the respective sulfates, and in the case of barium, the sulfate is only slightly less soluble than the carbonate. It was demonstrated that the carbonates were ineffective alone. However, when sulfate was added to the liquor prior to the addition of the soluble alkaline earth compound, it was found that the character of the precipitate changed and at the same time lead was removed from solution. A totally unexpected phenomenon was that tin was removed along with the lead. This was a desirable consequence (since tin is an undesirable impurity in high purity copper) of the procedure that was not anticipated. It is thought that the tin and lead stay in solution as some type of unionized but soluble complex, such as stannic or stannous plumbite. However, when the lead is removed, this complex is destroyed and the tin separates apparently as a sparingly soluble hydrated oxide.

We claim:

1. The process of recovering lead and tin from rich alkaline leach liquor solutions containing copper, ammonia, carbon dioxide, lead and tin, that includes adding to said solution a water soluble sulfate, adding to the sulfated and still alkaline solution a precipitating compound of the group consisting of water soluble salts of strontium, barium and calcium and hydroxides of strontium, barium and calcium, and thereby simultaneously precipitating separable tin and lead compounds from the solution.

2. The process of claim 1, in which the mole ratio of the soluble sulfate to added precipitating compound is between 1 to 10, to 1.

3. The process of claim 1, in which said precipitating compound is added in the ratio of from about 1.0 to 8.0 grams of the metallic cation thereof to 1 gram of lead in said leach liquor.

4. The process of claim 1, in which said precipitating compound is added in the ratio of from about 1.0 to 8.0 grams of the metallic cation thereof to 1 gram of lead in said leach liquor, and the mole ratio of the soluble sulfate to the precipitating compound is between 1 to 10, to 1.

5. The process of claim 4, in which initially and throughout the precipitation, said rich liquor solution has a pH between about 10 to 12.

6. The process of claim 4, in which zinc is present in the leach liquor and the precipitated lead and tin compounds are substantially free from zinc.

7. The process of claim 4, in which said soluble sulfate is ammonium sulfate.

8. The process of claim 4, in which said soluble sulfate is sulfuric acid.

9. The process of claim 4, in which said precipitating compound is a strontium salt.

10. The process of claim 4, in which said precipitating compound is strontium nitrate.

11. The process of claim 4, in which said precipitating compound is strontium acetate.

12. The process of claim 4, in which said precipitating compound is strontium hydroxide.

References Cited in the file of this patent

UNITED STATES PATENTS

| | | |
|---|---|---|
| 1,484,088 | Schumacher | Feb. 19, 1924 |
| 2,695,226 | Lebedeff | Nov. 23, 1954 |